United States Patent
Baccouche et al.

(10) Patent No.: US 11,072,307 B1
(45) Date of Patent: Jul. 27, 2021

(54) EXTERNAL SIDE AIRBAG

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Srinivasan Sundararajan, Ann Arbor, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/750,054

(22) Filed: Jan. 23, 2020

(51) Int. Cl.
| *B60R 21/36* | (2011.01) |
| *B60R 21/0134* | (2006.01) |
| *B60R 21/00* | (2006.01) |
| *B60R 21/01* | (2006.01) |

(52) U.S. Cl.
CPC .......... *B60R 21/36* (2013.01); *B60R 21/0134* (2013.01); *B60R 2021/0006* (2013.01); *B60R 2021/01013* (2013.01); *B60R 2021/01231* (2013.01)

(58) Field of Classification Search
CPC ................ B60R 21/36; B60R 21/0134; B60R 2021/0006; B60R 2021/01231; B60R 2021/01013
See application file for complete search history.

(56) References Cited

U.S. PATENT DOCUMENTS

| 5,646,613 | A | * | 7/1997 | Cho ................... B60R 19/38 340/903 |
| 6,454,326 | B2 | | 9/2002 | Demarquilly et al. |
| 6,883,631 | B2 | | 4/2005 | Hu et al. |
| 6,923,483 | B2 | | 8/2005 | Curry et al. |
| 7,000,725 | B2 | | 2/2006 | Sato et al. |
| 7,174,985 | B2 | | 2/2007 | Sawa et al. |
| 7,232,001 | B2 | | 6/2007 | Hakki et al. |
| 7,753,159 | B2 | | 7/2010 | Kim et al. |
| 7,806,221 | B2 | * | 10/2010 | Mishra ................. B60R 21/013 180/274 |
| 8,408,350 | B2 | | 4/2013 | Wilmot et al. |
| 8,801,035 | B2 | | 8/2014 | Kim et al. |
| 10,046,729 | B2 | | 8/2018 | Perez Garcia et al. |
| 2002/0027339 | A1 | | 3/2002 | Breed |
| 2002/0166710 | A1 | * | 11/2002 | Breed .................. B60N 2/2806 180/282 |
| 2003/0155750 | A1 | * | 8/2003 | Hu ....................... B60R 21/013 280/730.1 |
| 2004/0074690 | A1 | | 4/2004 | Sato et al. |
| 2005/0269805 | A1 | | 12/2005 | Kalliske et al. |
| 2006/0043712 | A1 | * | 3/2006 | Hakki .................. B60R 19/205 280/735 |

(Continued)

Primary Examiner — Darlene P Condra
(74) Attorney, Agent, or Firm — Frank A. MacKenzie; Bejin Bieneman PLC

(57) ABSTRACT

A vehicle includes a body having two pillars spaced from each other. The body includes a rocker extending from one pillar to the other pillar. An airbag is fixed to the rocker and inflatable to an inflated position. The airbag extends outboard of the rocker in the inflated position. The airbag includes a first chamber and a second chamber substantially fluidly separated from each other. The first chamber extends farther outboard of the rocker in the inflated position than the second chamber.

19 Claims, 6 Drawing Sheets

(56) References Cited

U.S. PATENT DOCUMENTS

| | | |
|---|---|---|
| 2006/0197319 A1 | 9/2006 | Nakamura |
| 2013/0147174 A1* | 6/2013 | Kim ...................... B60R 19/205 280/770 |
| 2016/0355152 A1* | 12/2016 | Perez Garcia .... B60R 21/23138 |
| 2019/0054957 A1* | 2/2019 | Faruque ............... B62D 21/157 |

* cited by examiner

EXTERNAL SIDE AIRBAG

BACKGROUND

Vehicles are typically equipped with airbags. In the event of an impact, inflators activate and provide inflation medium to the airbags, and the airbags pressurize and act as supplemental restraints for occupants during the impact. The airbags are located at various fixed positions in passenger cabins of vehicles. Vehicles typically include a driver airbag mounted in the steering wheel, a passenger airbag mounted in the top of the dash in a vehicle-forward direction from the front passenger seat, and side curtain airbags mounted in the roof rails above the doors.

DETAILED DESCRIPTION

Figure 1:
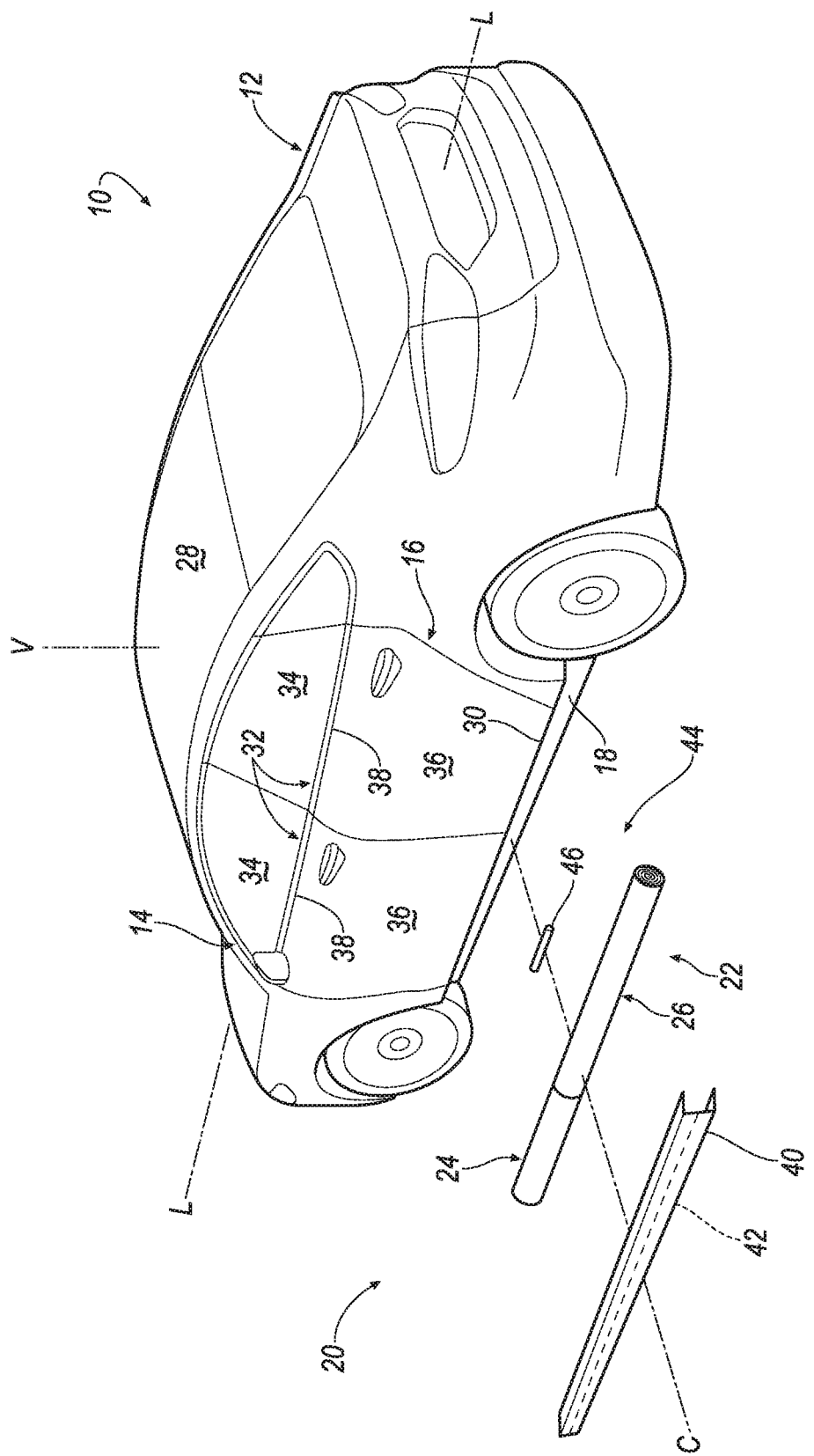
FIG. 1 is a perspective view of a vehicle including an external airbag system having an airbag in an uninflated position.

A vehicle includes a body includes two pillars spaced from each other. The body includes a rocker extending from one pillar to the other pillar. The vehicle further includes an airbag fixed to the rocker and inflatable to an inflated position. The airbag extends outboard of the rocker in the inflated position. The airbag includes a first chamber and a second chamber substantially fluidly separated from each other. The first chamber extends farther outboard of the rocker in the inflated position than the second chamber.

The first chamber may overlap one pillar in the inflated position.

The second chamber may be disposed along the body between the two pillars in the inflated position.

The second chamber may abut the first chamber.

The vehicle may include a cover fixed to the rocker and covering the airbag. The cover may include a tear seam and the airbag may extend through the tear seam of the cover in the inflated position.

The airbag may extend upwardly from the rocker in the inflated position.

The body may include a beltline spaced from the rocker and the airbag may include a top surface extending along the first chamber and the second chamber. The top surface may be disposed closer to the beltline than the rocker in the inflated position.

The first chamber may include a first impact surface and the second chamber may include a second impact surface. The second impact surface may extend generally along the body and the first impact surface may extend transverse to the second impact surface.

The vehicle may include an inflator in fluid communication with both the first chamber and the second chamber.

The vehicle may include a sensor and a computer in communication with the sensor.

The computer may be programmed to actuate the inflator based on the sensor sensing a pre-impact.

The inflator may initiate inflation of the first chamber prior to the second chamber.

An external airbag system includes a rocker and an airbag fixed to the rocker and inflatable to an inflated position. The airbag extends outboard of the rocker in the inflated position. The airbag includes a first chamber and a second chamber substantially fluidly separated from the first chamber. The first chamber extends farther outboard of the rocker in the inflated position than the second chamber.

The external airbag system may include two pillars. The rocker may extend from one pillar to the other pillar, and the first chamber may overlap one pillar in the inflated position.

The second chamber may abut the first chamber.

The external airbag system may include a cover fixed to the rocker and covering the airbag. The cover may include a tear seam and the airbag may extend through the tear seam of the cover in the inflated position.

The airbag may extend upwardly from the rocker in the inflated position.

The first chamber may include a first impact surface and the second chamber may include a second impact surface. The second impact surface may extend along the cover and the first impact surface may extend transverse to the second impact surface.

The external airbag system may include an inflator in fluid communication with both the first chamber and the second chamber.

The external airbag system may include a sensor and a computer in communication with the sensor. The computer may be programmed to actuate the inflator based on the sensor sensing a pre-impact.

The inflator may initiate inflation of the first chamber prior to the second chamber.

With reference to the Figures, wherein like numerals indicate like parts throughout the several views, a vehicle 10 is generally shown. The vehicle 10 includes a body 12 having two pillars 14, 16 spaced from each other. The vehicle 10 includes an external airbag system 20 having a rocker 18 extending from one pillar 14 to the other pillar 16. The external airbag system 20 includes an airbag 22 fixed to the rocker 18 and inflatable to an inflated position. The airbag 22 extends outboard of the rocker 18 in the inflated position. The airbag 22 includes a first chamber 24 and a second chamber 26 substantially fluidly separated from each other. The first chamber 24 extends farther outboard of the rocker 18 in the inflated position than the second chamber 26.

Figure 3:
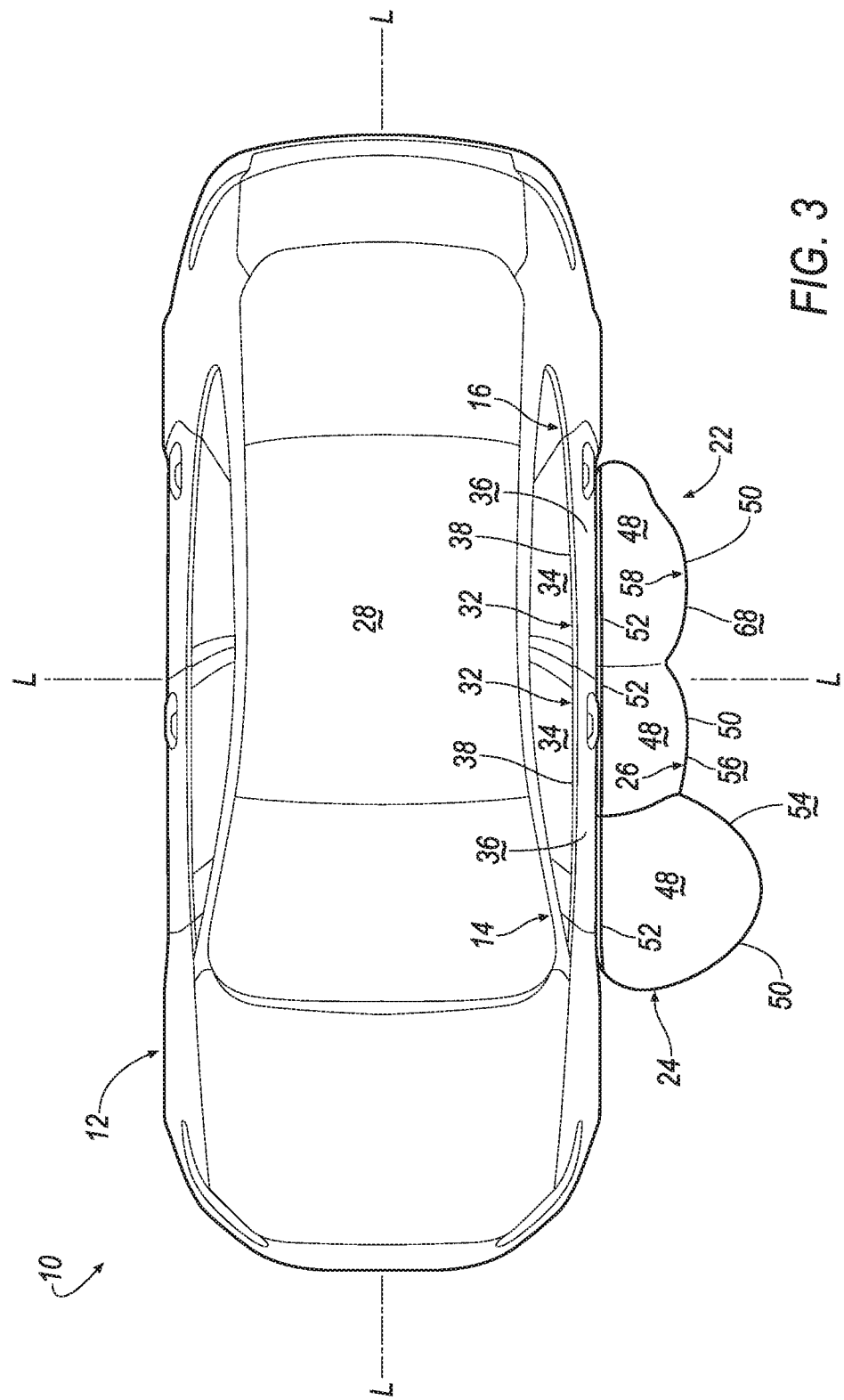
FIG. 3 is a top view of the vehicle including the external airbag system having the airbag in the inflated position.

Since the first chamber 24 extends farther outboard of the rocker 18 than the second chamber 26 in the inflated position, as shown in FIG. 3, the first chamber 24 may be impacted by an object prior to the object impacting the second chamber 26, which may allow the first chamber 24 to manage kinetic energy of the impact through rotation of the impacting object and/or rotation of the vehicle 10. Additionally, the first chamber 24 may be positioned, as discussed further below, such that during the impact the first chamber 24 transfers force from the impact to one pillar 14, which may reduce force delivered to a door 32 to reduce door intrusion.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With continued reference to FIG. 1, the vehicle 10 may define a longitudinal axis L, e.g., extending between a front and a rear of the vehicle 10. The vehicle 10 may define a cross-vehicle axis C, e.g., extending between a left side and a right side of the vehicle 10. The vehicle 10 may define a vertical axis V, e.g., extending between a top and a bottom of the vehicle 10. The longitudinal axis L, the cross-vehicle axis C, and the vertical axis V may be perpendicular to each other.

The vehicle 10 includes the body 12 and a frame (not numbered). The body 12 and frame may be of a unibody construction. In the unibody construction, the body 12 serves as the vehicle frame, and the body 12 is unitary, i.e., a continuous one-piece unit. As another example, the body 12 and frame may have a body-on-frame construction (also referred to as a cab-on-frame construction). In other words, the body 12 and frame are separate components, i.e., are modular, and the body 12 is supported on and affixed to the frame. Alternatively, the body 12 and frame may have any suitable construction. The body 12 and/or the frame may be formed of any suitable material, for example, steel, aluminum, etc.

The body 12 defines a passenger cabin (not numbered) to house occupants, if any, of the vehicle 10. The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10.

With reference to FIG. 1, the body 12 includes a roof 28 and a floor 30 spaced from the roof 28. The pillars 14, 16 extend downwardly from the roof 28, i.e., generally towards the floor 30. The roof 28 and the floor 30 may each extend across the passenger cabin, i.e., from one side to the other side of the vehicle 10 and from the front end to the rear end of the passenger cabin. The roof 28 may define an upper boundary of the passenger cabin and the floor 30 may define a lower boundary of the passenger cabin.

With continued reference to FIG. 1, the body 12 includes at least one door 32 on each side of the vehicle 10. The doors 32 each include a side window 34 and a door body 36. The side window 34 can be fully or partially retractable inside the respective door body 36. The door body 36 extends downward from a visible portion of the respective side window 34. The doors 32 define part of a beltline 38 around the vehicle 10. For the purposes of this disclosure, a "beltline" is defined as a bottom edge of visible glass panels of the vehicle 10. For the vehicle 10 the beltline 38 is the bottom edge of the visible portions of the windshield, the side windows 34, and the backlite. For the doors 32 the beltline 38 is the top edge of the door bodies 36.

With continued reference to FIG. 1, the body 12 includes at least two pillars 14, 16 on each side of the vehicle 10. The pillars 14, 16 are spaced from each other along the longitudinal axis L. Each pillar 14, 16 partially defines at least one door opening. One pillar 14 may, for example, be disposed at the front end of the passenger cabin, i.e., one pillar 14 may be referred to as an "A-pillar." In such an example, the one pillar 14 is disposed between a windshield and a respective door 32, i.e., a front door. The other pillar 16 may, for example, be disposed at the rear end of the passenger cabin. In such an example, the other pillar 16 may be disposed between a backlite and a respective door 32, i.e., a rear door. As another example, the other pillar 16 may be disposed between the front end and the rear end of the passenger cabin. In such an example, the other pillar 16 may be disposed between two respective doors 32, i.e., the front door and the rear door.

With continued reference to FIG. 1, the vehicle 10 includes two rockers 18 spaced from each other along the cross-vehicle axis C. In other words, one rocker 18 is disposed on one side of the vehicle 10 and the other rocker 18 is disposed on the other side of the vehicle 10. The rockers 18 may be components of the body 12 and/or the frame. The rockers 18 are the lowest portion of a side of the vehicle 10. The rockers 18 provide rigidity at the respective side of the vehicle 10. The rockers 18 support vehicle 10 components, such as the floor 30, the doors 32, etc. Each rocker 18 is elongated along the longitudinal axis L from one pillar 14 to the other pillar 16. The rockers 18 may include a step to ease entry and egress to and from the vehicle 10.

With continued reference to FIG. 1, a cover 40, i.e., a rocker panel, may be fixed to each rocker 18. The cover 40 may, for example, extend from one pillar 14 to the other pillar 16. The cover 40 may include a class-A surface, i.e., i.e., a surface specifically manufactured to have a high quality, finished aesthetic appearance free of blemishes. The cover 40 is outboard of the rocker 18 and extends over the rocker 18. That is, the cover 40 covers the rocker 18. The cover 40 may be, for example, plastic.

With continued reference to FIG. 1, the cover 40 may include a tear seam 42. For example, the tear seam 42 may extend along the longitudinal axis L, e.g., between the pillars 14, 16. The tear seam 42 may, for example, be disposed adjacent to the airbag 22. Said differently, the airbag 22 may extend through the tear seam 42 in the inflated position. The tear seam 42 may have any suitable shape. For example, the tear seam 42 may have a linear shape, i.e., extending in a line along the cover 40.

The tear seam 42 may be designed to tear apart when subjected to a tensile force above a threshold magnitude. In other words, the cover 40 on one side of the tear seam 42 separates from the cover 40 on the other side of the tear seam 42 when the force is above the threshold magnitude. The threshold magnitude may be chosen to be greater than forces from, e.g., inadvertent pushing against the cover 40 by an occupant but be less than forces from the deployment of the airbag 22. The tear seam 42 may be, for example, a line of perforations through the covering, a line of thinner cover 40 material than the rest of the cover 40, etc.

With continued reference to FIG. 1, the external airbag system 20 may include an airbag assembly 44, which includes the airbag 22 and an inflator 46. The rocker 18 may support the airbag assembly 44, and specifically, may support the airbag 22 when the airbag 22 is in the inflated position. The airbag assembly 44 may be mounted to the rocker 18, as set forth below. The external airbag system 20 may include any suitable number of airbag assemblies 44. For example, the external airbag system 20 may include one airbag assembly 44 for each rocker 18.

The airbag 22 is supported by the rocker 18, as shown in FIG. 1. For example, the airbag assembly 44 may be fixed to the rocker 18. The airbag 22 may, for example, be disposed between the rocker 18 and the cover 40 in the uninflated position. In other words, the cover 40 may cover the airbag 22 in the uninflated position. As another example, the airbag assembly 44 may be fixed to the cover 40, e.g., an inboard surface, a bottom surface, etc.

The airbag 22 may be formed of any suitable airbag material, for example, a woven polymer. For example, the airbag 22 may be formed of woven nylon yarn, for example, nylon 6-6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc.

The airbag 22 may be a single continuous unit, e.g., a single piece of fabric. Alternatively, the airbag 22 may include a plurality of segments, i.e., two or more. The segments may be attached to each other in any suitable fashion, e.g., a plurality of panels attached by stitching, ultrasonic welding, etc.

The airbag 22 is inflatable from an uninflated position, as shown in FIG. 1, to an inflated position, as shown in FIGS. 2-5. In the uninflated position, the airbag 22 is disposed along the rocker 18 between one pillar 14 and the other pillar 16, as shown in FIG. 1. For example, the airbag 22 may be elongated along the longitudinal axis L in the uninflated position. In other words, the longest dimension of the airbag 22 in the uninflated position may be along the longitudinal axis L. The airbag 22 may, for example, be rolled about the longitudinal axis L in the uninflated position, as shown in FIG. 1. That is, the airbag 22 may be rolled into a roll extending along the rocker 18, i.e., a centerline of the roll of the airbag 22 extends along the rocker 18.

Figure 2:
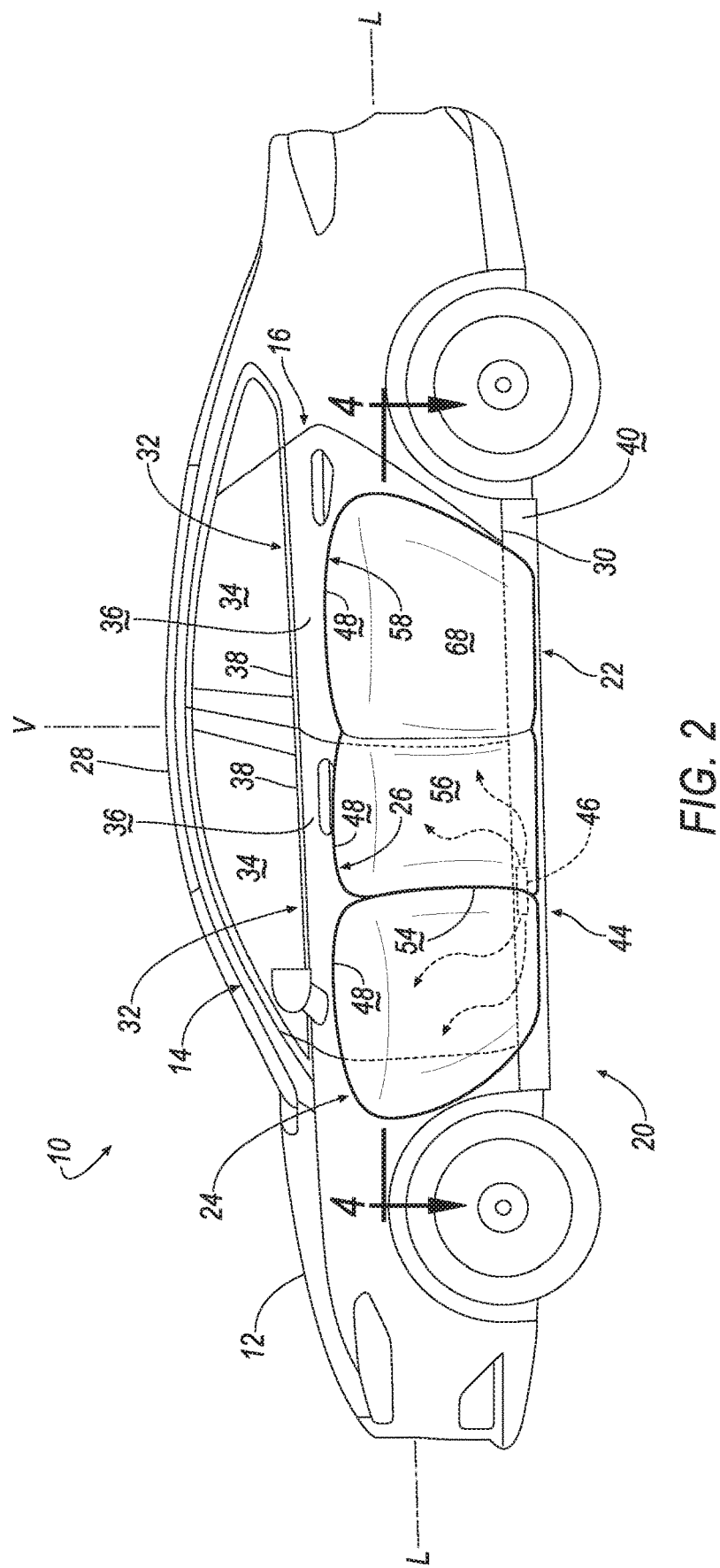
FIG. 2 is a side view of the vehicle including the external airbag system having the airbag in the inflated position.

The inflated position may be the position of the airbag 22 at the end of inflation by the inflator 46, i.e., just before the inflator 46 is exhausted. The airbag 22 is external to the passenger cabin in the inflated position. In the inflated position, the airbag 22 extends upwardly, i.e., along the vertical axis V, from the rocker 18, as shown in FIG. 2. Additionally, in the inflated position, the airbag 22 extends outwardly, i.e., along the cross-vehicle axis C, from the rocker 18, as shown in FIG. 3. The airbag 22 may, for example, extend through the cover 40, i.e., the tear seam 42, in the inflated position. As another example, the airbag 22 may extend around the cover 40 in the inflated position.

The airbag 22 includes a top surface 48 extending along the first chamber 24 and the second chamber 26, as shown in FIGS. 2 & 3. The top surface 48 is spaced from the rocker 18 in the inflated position. That is, the airbag 22 extends along the vertical axis V from the rocker 18 to the top surface 48 in the inflated position. The top surface 48 may be spaced any suitable amount from the rocker 18. For example, the top surface 48 may be disposed between the rocker 18 and the beltline 38 in the inflated position, as shown in FIG. 2. That is, the airbag 22 may extend upwardly from the rocker 18 towards the beltline 38 in the inflated position. In such an example, the top surface 48 may be disposed closer to the beltline 38 than the rocker 18 in the inflated position. As another example, the top surface 48 may be disposed adjacent to the beltline 38 in the inflated position. That is, the airbag 22 may extend upwardly from the rocker 18 to the beltline 38 in the inflated position.

The first chamber 24 is disposed between one pillar 14 and the second chamber 26 in the uninflated position, as shown in FIG. 1. In other words, the first chamber 24 is disposed between the pillars 14, 16 in the uninflated position. In the inflated position, the first chamber 24 overlaps one pillar 14 along the longitudinal axis L, as shown in FIGS. 2-5. That is, the first chamber 24 extends, e.g., partially along one door 32, across one pillar 14 in the inflated position. The airbag 22, i.e., the first chamber 24, extends farther along the longitudinal axis L in the inflated position as compared to the uninflated position. Said differently, the airbag 22, i.e., the first chamber 24, expands along the longitudinal axis L during inflation. By overlapping one pillar 14 in the inflated position, the first chamber 24 can transfer force from an impact to the pillar 14, which can resist door intrusion, as set forth above.

The second chamber 26 is disposed along the body 12 between the two pillars 14, 16 in the inflated position, as shown in FIGS. 2-5. Said differently, the second chamber 26 is spaced from both pillars 14, 16 along the longitudinal axis L. For example, the second chamber 26 may be extend along a portion of at least one door 32 in the inflated position. The second chamber 26 may abut the first chamber 24. That is, the second chamber 26 may extend along the body 12 from the first chamber 24 towards the other pillar 16.

As set forth above, the first chamber 24 and the second chamber 26 are substantially fluidly separated from each other. Substantially fluidly separated means little or no inflation medium flows from one to another, but the inflation medium can come from the same source, e.g., a common inflator 46 that separately feeds the first chamber 24 and the second chamber 26 through separate fill tubes. As one example, the first chamber 24 and the second chamber 26 are completely fluidly separated, i.e., there is not flow of inflation medium between the first chamber 24 and the second chamber 26. In another example, due to manufacturing and material capabilities, a minimal amount of inflation medium may flow between the first chamber 24 and the second chamber 26, e.g., through panels, seams etc., but in such an event, the first chamber 24 is maintained at a higher pressure that the second chamber 26 during inflation. In any event, in scenarios when the airbag 22 is inflated and impacted, the pressure in the first chamber 24 and the second chamber 26 are independent, i.e., no appreciable pressure difference is communicated from one of the first and second chambers 24, 26 to the other of the first and second chambers 24, 26.

The first chamber 24 and the second chamber 26 may be formed separate, i.e., may be formed as separate bags that are subsequently attached together on a common base. In such an example, the chambers 24, 26 may be formed of a same or different material. As another example, the chambers 24, 26 could be formed from a single bag with a panel and/or stitching separating the chambers 24, 26.

The airbag 22 may include a third chamber 58. The third chamber 58 may be identical to one of the first chamber 24 or the second chamber 26. For example, the third chamber 58 may be identical to the second chamber 26, as shown in FIGS. 2-5. In such an example, the third chamber 58 may extend from the second chamber 26 towards the other pillar 16, i.e., away from the first chamber 24. Additionally, the third chamber 58 may be in fluid communication with the second chamber 26. As another example, the third chamber 58 may be identical to the first chamber 24. In such an example, the third chamber 58 overlaps the other pillar 16 in the inflated position. That is, the third chamber 58 is spaced from the first chamber 24 along the longitudinal axis L by the second chamber 24. Said differently, the second chamber 26 extends from the first chamber 24 to the third chamber 58. Additionally, the third chamber 58 may be substantially fluidly separated from the second chamber 26.

Figure 4:
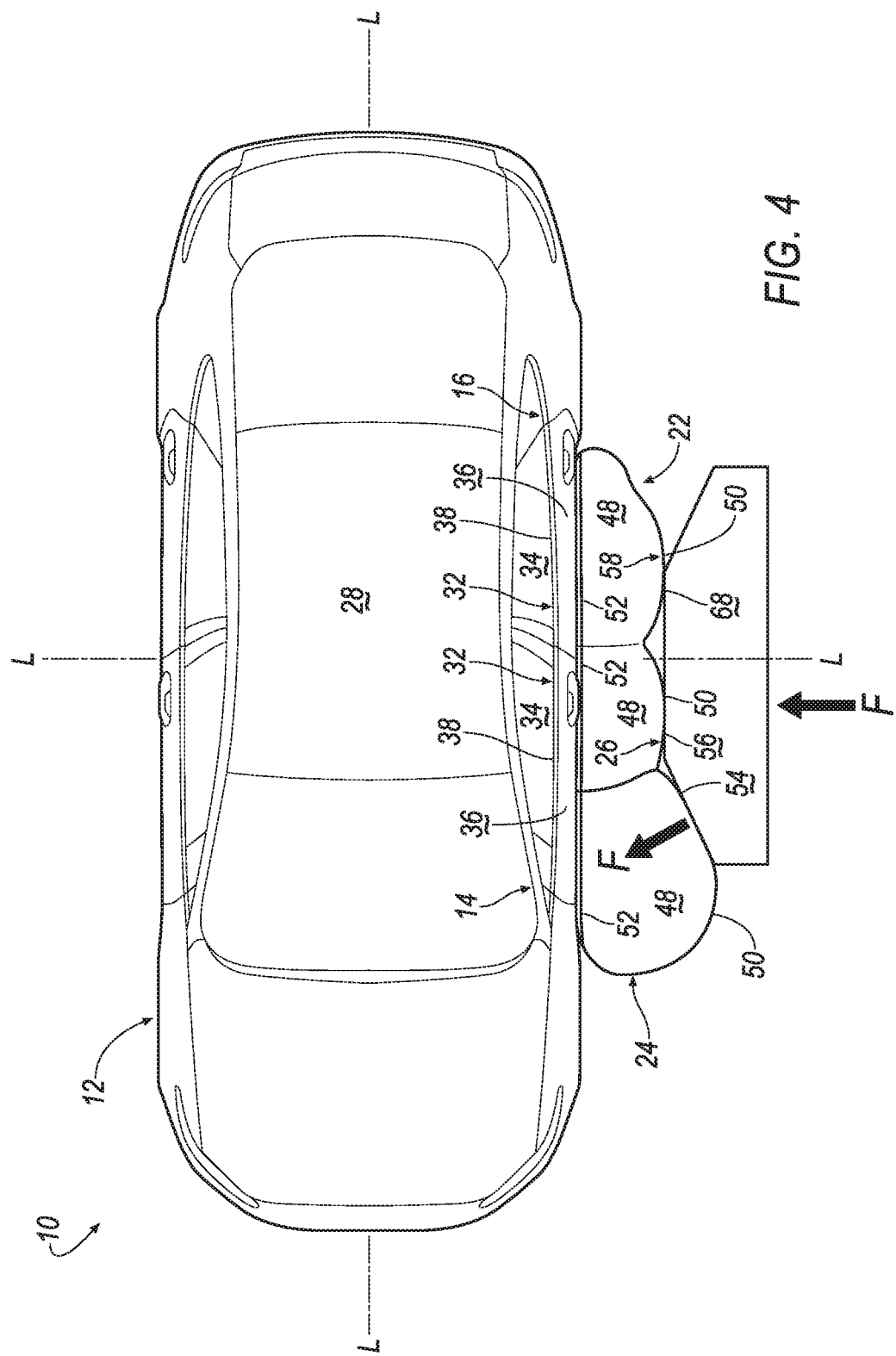
FIG. 4 is a top view of an object impacting the airbag in the inflated position.
Figure 5:
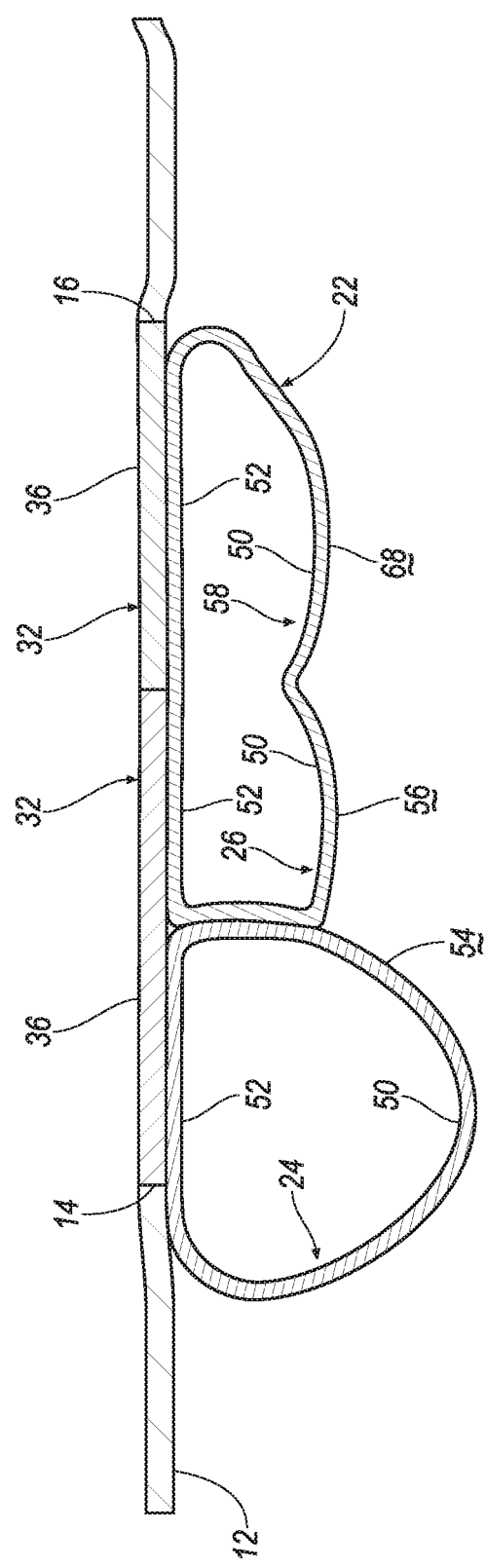
FIG. 5 is a cross-sectional view of the airbag in the inflated position along line 4 in FIG. 2.

Each chamber 24, 26, 58 includes an outboard panel 50 and an inboard panel 52, as shown in FIGS. 3-5. The inboard panel 52 may abut the vehicle 10, e.g., the doors 32, in the inflated position. The inboard panel 52 faces the vehicle 10, e.g., the doors 32, in the inflated position. The outboard panel 50 is spaced from the vehicle 10 in the inflated position. The outboard panel 50 faces away from the vehicle 10 in the inflated position. During inflation, the outboard panel 50 may, for example, move away from the vehicle 10 such that the outboard panel 50 is spaced farther from the vehicle 10 in the inflated position as compared to the uninflated position.

With reference to FIGS. 3-5, the outboard panel 50 of the first chamber 24 is spaced farther from the vehicle 10 along the cross-vehicle axis C than the outboard panels 50 of the second chamber 26 and the third chamber 58. In other words, the outboard panels 50 of the second chamber 26 and the third chamber 58 are disposed along the cross-vehicle axis C between the vehicle 10, e.g., the doors 32, and the outboard panel 50 of the first chamber 24 in the inflated position. Said differently, the first chamber 24 extends farther along the cross-vehicle axis C, i.e., outboard from the body 12, then the second chamber 26 and the third chamber 58 in the inflated position.

With continued reference to FIGS. 3-5, the first chamber 24 includes a first impact surface 54, and the second chamber 26 includes a second impact surface 56. The first impact surface 54 is on the outboard panel 50 of the first chamber 24, and the second impact surface 56 is on the outboard panel 50 of the second chamber 26. The first and second impact surfaces 54, 56 are positioned to receive and be impacted by an object external to the passenger cabin during an impact. The second impact surface 56 extends from the first chamber 24 towards the other pillar 16, e.g., to the third chamber 58, generally along the body 12, i.e., the longitudinal axis L. The first impact surface 54 extends from the second chamber 26 outwardly from the vehicle 10, e.g., to an apex (not numbered) of the first chamber 24. That is, the first impact surface 54 extends transverse to the second impact surface 56, i.e., the longitudinal axis L. For example, the first impact surface 54 may extend oblique, i.e., neither parallel nor perpendicular, to both the longitudinal axis L and the cross-vehicle axis C. By extending transverse to the second impact surface 56, the first impact surface 54 can assist in managing kinetic energy during an impact through object rotation, as set forth above.

In one example, the object may be a side barrier of a side barrier impact test defined by the Insurance Institute for Highway Safety (IIHS), as shown in FIG. 4. The side barrier impact test defined by the IIHS specifies a stationary test vehicle is struck on the driver side by a crash cart fitted with a 1,500 kilogram moving deformable barrier (MBD). The MBD has an impact velocity of 50 km/h (31.1 mi/h) and strikes the vehicle on the driver side at a 90 degree angle. In such an example, the object impacts the first impact surface 54 of the first chamber 24 prior to impacting the second impact surface 56 of the second chamber 26, as shown in FIG. 4. Since the pressure in the first chamber 24 is independent of the pressure in the second chamber 26, as described above, a force F from the object impacting the first chamber 24 is transferred via the first chamber 26 to the pillar 14, which may reduce the force F delivered from the object to the second chamber 26 upon the object impacting the second impact surface 56 of the second chamber 26. Additionally, the first chamber 24 exerts a force on the object transverse to the longitudinal axis L, which can manage kinetic energy of the object through object rotation.

The third chamber 58 includes a third impact surface 68. The third impact surface 68 extends from the second chamber 26 away from the first chamber 24. In the case that the third chamber 58 is identical to the second chamber 26, as shown in FIGS. 2-5, the third impact surface 68 is identical to the second impact surface 56. In the case that the third chamber 58 is identical to the first chamber 24, the third impact surface 68 is identical to the first impact surface 54.

At least one inflator 46 is in fluid communication with the first chamber 24 and the second chamber 26. Upon receiving a signal from, e.g., a computer 60, the inflator 46 may initiate inflation of the first chamber 24 and the second chamber 26 with and inflatable medium, such as a gas, simultaneously. Alternatively, upon receiving a signal from, e.g., the computer 60, the inflator 46 may initiate inflation of the first chamber 24 prior to the second chamber 26. The inflator 46 may be, for example, a pyrotechnic inflator that uses a chemical reaction to drive inflation medium to the first chamber 24 and the second chamber 26. The inflator 46 may be of any suitable type, for example, a cold-gas inflator. The inflator 46 may be fixed to the floor 30, the rocker 18, e.g., to one of the cover 40 or the rocker 18, or any other suitable vehicle 10 component.

In some examples, the airbag assembly 44 incudes a single inflator 46 in fluid communication with both the first chamber 24 and the second chamber 26. In such an example, the inflator 46 may have two separate outlets in communication with the first chamber 24 and the second chamber 26, respectively, as shown in FIG. 2. The two outlets may, for example, be sized to inflate the respective chamber to a desired inflation pressure within a desired amount of time. As another example, the inflator 46 may be in separate communication with the first chamber 24 and the second chamber 26 with fill tubes. In alternative examples, the inflators 46 may separately inflate the first chamber 24 and the second chamber 26 in any suitable fashion. For example, the airbag assembly 44 may include a first inflator in fluid communication with the first chamber 24 and a second inflator in fluid communication with the second chamber 26.

Figure 6:
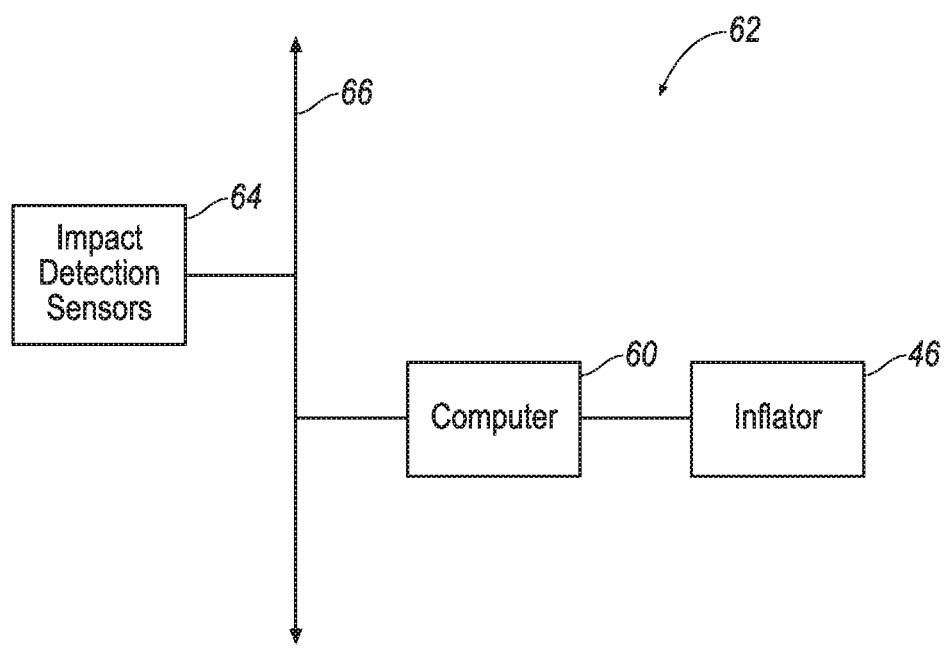
FIG. 6 is a block diagram of an inflation system for the airbag.

With reference to FIG. 6, the vehicle 10 may include an inflation system 62 having the computer 60. The computer 60 may be a microprocessor-based computing device implemented via circuits, chips, or other electronic components. For example, the computer 60 may include a processor, memory, etc. The memory may store instructions executable by the processor and the processor may read the instructions from the memory and execute the instructions. The computer 60 may be programmed to initiate inflation of the airbag 22 in response to a vehicle pre-impact.

The vehicle 10 may include impact detection sensors 64 programmed to detect the vehicle pre-impact. In other words, the impact detection sensors 64 may be configured to sense impact prior to impact, i.e., pre-impact sensing. The impact detection sensors 64 may be disposed in the vehicle 10. The impact detection sensors 64 may be pre-impact sensors such as radar, lidar, and vision-sensing systems. The vision systems may include one or more cameras, CCD image sensors, CMOS image sensors, etc. When the impact detection sensors 64 sense the vehicle pre-impact occurs, the processor may receive one or more signals from the impact detection sensors 64 indicating the vehicle pre-impact. In response to receiving the signals from the impact detection sensors 64, the processor may initiate the inflation of the airbag 22.

In order to receive the signals from the sensors, e.g., the impact detection sensors 64, and to initiate the inflation of the airbag 22, the processor communicates with the sensors, e.g., the impact detection sensors 64, and the inflator 46, e.g., through a direct electrical wiring, through which an analog or a digital signal is transmitted, or through a communication network 66 like CAN (Control Area Network), Ethernet, LIN (Local Interconnect Network) or any other way.

In operation, the airbag 22 is in the uninflated position, under normal operating conditions of the vehicle 10. In the event of a vehicle pre-impact, the impact detection sensors 64 detect the pre-impact. The impact detection sensors 64 transmit a signal indicating the vehicle pre-impact through the communication network 66 to the computer 60. When the vehicle pre-impact is detected, the computer 60 transmits a signal through the communication network 66 triggering the inflator 46 to inflate the airbag 22 with inflation medium from the uninflated position to the inflated position. When the inflator 46 inflates the airbag 22 to the inflated position, the inflation medium flows into the airbag 22, increasing the pressure in the airbag 22. As the pressure is increased in the airbag 22, the airbag 22 extends upwardly from the rocker 18 and inflation medium flows into the first chamber 24 and the second chamber 26. In the inflated position, the first chamber 24 overlaps one pillar 14 and extends farther outboard from the rocker 18 than the second chamber 26. In an example in which the object spans the first chamber 24 and the second chamber 26, as the object moves towards the vehicle 10, the object impacts the first chamber 24 prior to the second chamber 26. When the object impacts the first chamber 24, the object impacts the first impact surface 54 at an angle transverse to the longitudinal axis of the vehicle 10, which may control kinetic energy of the object through object rotation. Additionally, when the object impacts the first chamber 24, the first chamber 24 may transfer force from the impact to the one pillar 14, which may assist in reducing door intrusion. For example, when the object is the side barrier for the IIHS side barrier impact test, as shown in FIG. 4, the side barrier may impact the first impact surface 54 of the first chamber 26 prior to impacting the second impact surface 56 of the second chamber 26. In such an example, the force of the side barrier impacting the first chamber 24 is transferred via the first chamber 24 to the one pillar 14 because the pressure in the first chamber 24 is independent of the pressure in the second chamber 26. Additionally, the first chamber 24 may control kinetic energy of the side barrier through object rotation, which can reduce the force applied from the side barrier to the second chamber 26 upon the side barrier impacting the second impact surface 56 of the second chamber 26.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first," "second," and "third" are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle comprising;
    a body including two pillars spaced from each other, the body including a rocker extending from one pillar to the other pillar;
    an airbag fixed to the rocker and inflatable to an inflated position, the airbag extending outboard of the rocker in the inflated position;
    the airbag including a first chamber and a second chamber substantially fluidly separated from each other, the first chamber extending farther outboard of the rocker in the inflated position than the second chamber; and
    the first chamber including a first impact surface and the second chamber including a second impact surface, the second impact surface extends generally along the body and the first impact surface extends transverse to the second impact surface.

2. The vehicle of claim 1, wherein the first chamber overlaps the one pillar in the inflated position.

3. The vehicle of claim 1, wherein the second chamber is disposed along the body between the two pillars in the inflated position.

4. The vehicle of claim 1, wherein the second chamber abuts the first chamber.

5. The vehicle of claim 1, further comprising a cover fixed to the rocker and covering the airbag, wherein the cover includes a tear seam and the airbag extends through the tear seam of the cover in the inflated position.

6. The vehicle of claim 1, wherein the airbag extends upwardly from the rocker in the inflated position.

7. The vehicle of claim 1, wherein the body includes a beltline spaced from the rocker and the airbag includes a top surface extending along the first chamber and the second chamber, the top surface is disposed closer to the beltline than the rocker in the inflated position.

8. The vehicle of claim 1, further comprising an inflator in fluid communication with both the first chamber and the second chamber.

9. The vehicle of claim 8, further comprising a sensor and a computer in communication with the sensor, the computer is programmed to actuate the inflator based on the sensor sensing a pre-impact.

10. The vehicle of claim 9, wherein the inflator initiates inflation of the first chamber prior to the second chamber.

11. An external airbag system comprising;
    a rocker;
    an airbag fixed to the rocker and inflatable to an inflated position, the airbag extending outboard of the rocker in the inflated position;
    the airbag including a first chamber and a second chamber substantially fluidly separated from the first chamber, the first chamber extends farther outboard of the rocker in the inflated position than the second chamber; and
    the first chamber including a first impact surface and the second chamber including a second impact surface, the second impact surface extends along the rocker and the first impact surface extends transverse to the second impact surface.

12. The external airbag system of claim 11, further comprising two pillars, wherein the rocker extends from the one pillar to the other pillar, and the first chamber overlaps one pillar in the inflated position.

13. The external airbag system of claim 11, wherein the second chamber abuts the first chamber.

14. The external airbag system of claim 11, further comprising a cover fixed to the rocker and covering the airbag, wherein the cover includes a tear seam and the airbag extends through the tear seam of the cover in the inflated position.

15. The external airbag system of claim 11, wherein the airbag extends upwardly from the rocker in the inflated position.

16. The external airbag system of claim 11, further comprising an inflator in fluid communication with both the first chamber and the second chamber.

17. The external airbag system of claim 16, further comprising a sensor and a computer in communication with the sensor, the computer is programmed to actuate the inflator based on the sensor sensing a pre-impact.

18. The external airbag system of claim 17, wherein the inflator initiates inflation of the first chamber prior to the second chamber.

19. A vehicle comprising;
a body including two pillars spaced from each other, the body including a rocker extending from one of the two pillars to another of the two pillars; and
an airbag fixed to the rocker and inflatable to an inflated position, the airbag extending outboard of the rocker in the inflated position;
the airbag including a first chamber and a second chamber substantially fluidly separated from each other, the first chamber extending from the second chamber towards the one pillar and away from the other pillar and extending farther outboard of the rocker in the inflated position than the second chamber.

* * * * *